March 15, 1960 A. S. MacLAREN 2,928,661
GAS AND LIQUID MIXING APPARATUS
Filed June 9, 1958 3 Sheets-Sheet 1
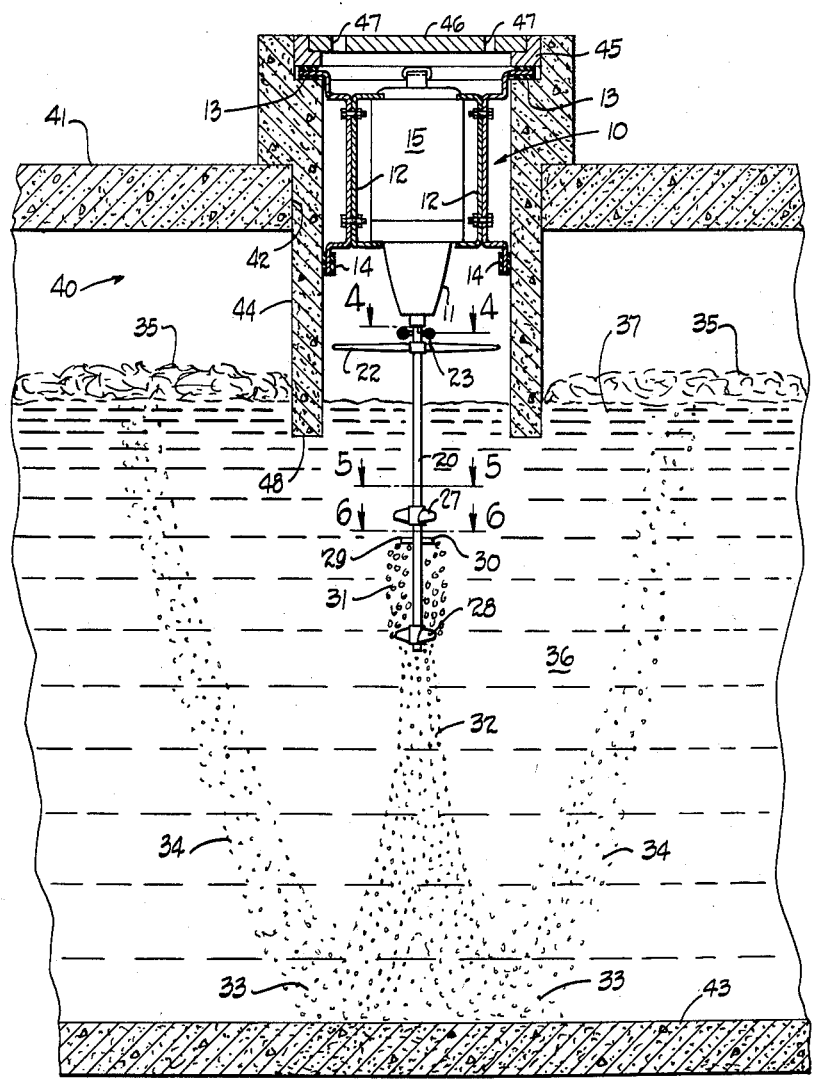
FIG_1
INVENTOR.
ALBERT S. MACLAREN
BY
ATTORNEY.

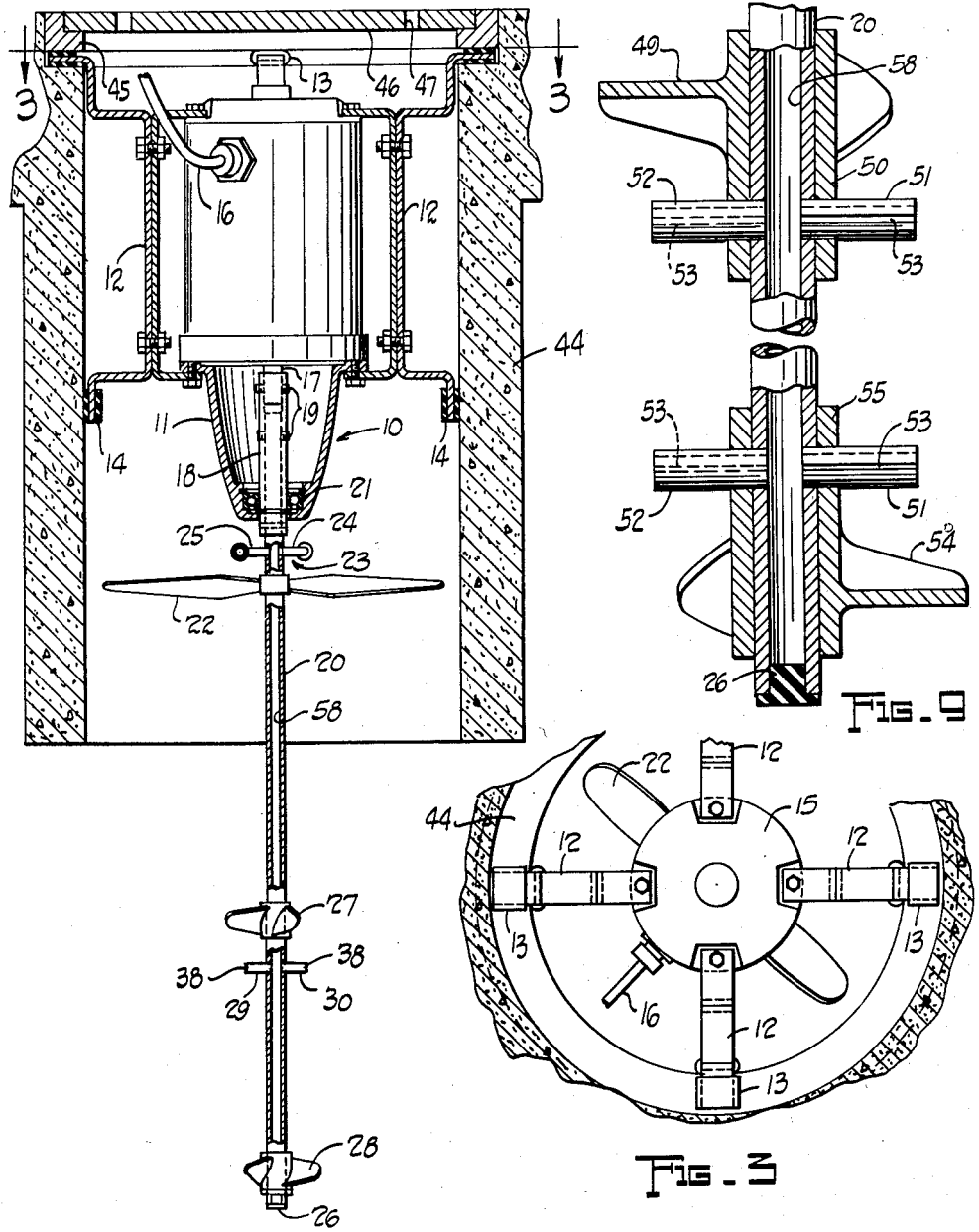

March 15, 1960 A. S. MacLAREN 2,928,661
GAS AND LIQUID MIXING APPARATUS
Filed June 9, 1958 3 Sheets-Sheet 3

INVENTOR.
ALBERT S. MacLAREN
BY
*Sanford Schnurmacher*
ATTORNEY

United States Patent Office 2,928,661
Patented Mar. 15, 1960

2,928,661

GAS AND LIQUID MIXING APPARATUS

Albert S. MacLaren, Chagrin Falls, Ohio

Application June 9, 1958, Serial No. 740,955

2 Claims. (Cl. 261—24)

This invention relates to gas and liquid contact apparatus, and particularly to mixing and aerating apparatus for use in the treatment of sewage by the activated sludge process.

Conducive to a better understanding of the invention, it may be well to point out that in such treatment of sewage the mixed liquors contain complex organic compounds in both solution and suspension which are broken down through bio-oxidation into simple stable compounds, by aerobic bacterial action. In order for the bacterial digestion to continue, oxygen must be supplied in adequate quantities to support aerobic bacterial life. Therefor, the mixed liquors must contain a plentiful supply of oxygen in solution, which must be continually renewed, if the process is not to stop. At the same time, the liquor must be kept in motion so that the suspended solids will continue to be digested and not settle out.

While a plentiful supply of oxygen, in the form of air is usually present at the liquid surface, the liquid surface is relatively small in relation to the entire volume of any liquid, therefore it is impossible to supply the oxygen demand by surface aeration alone. A way must be found to continusly introduce air into the liquor in order to carry as much oxygen as possible into solution. The percentage of oxygen carried into solution is controlled by several variables. Generally speaking, at a fixed temperature and percentage of oxygen saturation of the liquid, the amount of oxygen that can be brought into solution is in direct ratio to the length of time the bubble remains in contact with the liquid and in inverse ratio to the bubble size. For a fixed volume of air the smaller the bubble size the greater the percentage of oxygen which ts carried into solution. The greater the bubble detention time the greater the percentage of oxygen carried into solution. The solution of oxygen takes place at the bubble-liquid interface. The greater the percentage of saturation of oxygen in the liquid at the interface the slower the oxygen transfer. Intimate mixing therefore is of great importance, as it diffuses the oxygen throughout the tank contents and keeps the concentration of oxygen at the interface at a minimum.

The ideal device, from the viewpoint of oxygen pickup efficiency, would be one that introduced the air bubble near the liquid surface, caused the bubble to travel downward to the tank floor, have the downward velocity come to zero, have the bubble reverse direction and then rise to the surface. This would not only give the maximum length of travel (give the longest detention time) but would avoid the initial upward velocity normally imparted to the bubble by other devices. Still more contact time could be obtained by having the air bubble describe a wide flat spiral as it rises to the surface. The ideal bubble size is one with a long axis diameter of about 0.2 cm., or less, but large enough to avoid flotation of solid matter and to allow the bubble to break at the surface.

My invention produces an effect which closely approaches the ideal conditions stated above and in addition produces most intimate mixing.

The primary object of this invention, therefore, is to provide a device which will introduce gas or air bubbles near the surface of a liquid into a columnated downward moving high velocity liquid stream which will carry the bubbles to the bottom of the liquid mass before allowing them to reach zero velocity and reverse their path of travel for return to the surface.

Another object is to provide a device of the type stated having means for breaking up the air bubbles, as they are carried along in the stream, into bubbles of optimum small size (0.20 cm. on their long axes) but not the minute sizes which produce excessive frothing where the liquid has a low surface tension, and flotation, when finely divided solids are kept in suspension.

Still another object is to provide intimate mixing and circulation so that the absorbed gas is diffused throughout the entire liquid mass, so as to keep the concentration of gas at a low value at the bubble-liquid interface, thus increasing the rate of absorption and to prevent sedimentation of suspended matter.

These and other objects of the invention will become apparent from a reading of the following specification and claims, together with the accompanying drawings, wherein:

Figure 1 is a front elevation of the liquid mixing and aerating device that is the subject of this invention, as it appears mounted in a sewage treatment tank, shown in section;

Figure 2 is an enlarged front elevation of the device, with portions broken away and in section;

Figure 3 is a top plan view taken along the line and in the direction of the arrows 3—3 of Figure 2;

Figure 9 is an alternate form of propeller and aspirator tube construction in which each propeller has an aspirator tube associated therewith.

Figure 4:
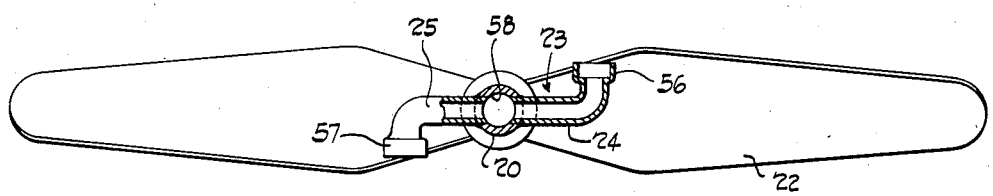
Figure 4 is a horizontal sectional view, taken along the line and in the direction of the arrows 4—4 of Figure 1.
Figure 5:
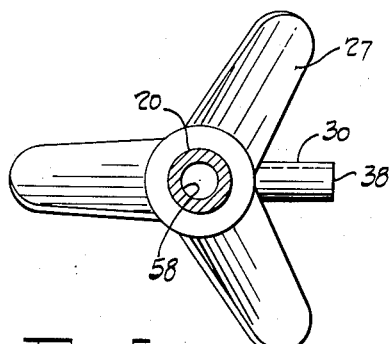
Figure 5 is a horizontal sectional view, taken along the line and in the direction of the arrows 5—5 of Figure 1.
Figure 6:
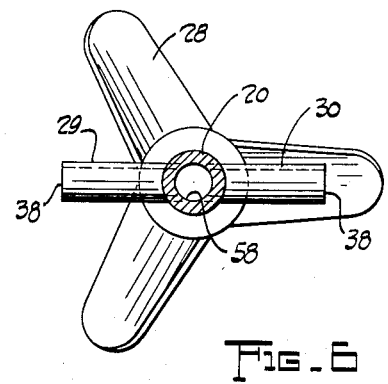
Figure 6 is a horizontal sectional view, taken along the line and in the direction of the arrows 6—6 of Figure 1.

Referring more particularly to the drawings, there is seen in Figure 1 the liquid mixing and aerating apparatus that is the subject of this invention, broadly indicated by reference numeral 10, as it appears when mounted in a conventional secondary sewage treatment tank 40 containing mixed sewage liquors 36 which are undergoing treatment by the activated sludge method, such as is well known by those skilled in the art.

Reference numerals 41 and 43 indicate the top and floor, respectively, of the tank 40. The top 41 has an opening 42 therethrough in which is fitted a clay or concrete sleeve 44 open at both ends. In the preferred form illustrated the sleeve is 22" long with a 12" inside diameter. The lower end 48 of the sleeve 44 extends about 2" below the liquid surface 37 and serves to provide a barrier which keeps the interior of the sleeve relatively free of foam 35 which normally forms on the liquid surface 37.

A support member 11 is mounted within the sleeve 44, above the water level 37, by means of 4 spaced bracket arms 12 having feet 14 which bear against the side walls of the sleeve, and feet 13 which rest upon the upper edge thereof, as is seen most clearly in Figures 2 and 3.

A man-hole ring 45 is seated on top of the bracket feet 13 and is grooved to receive a man-hole cover 46 which serves to close the top opening of the sleeve 44. The man-hole cover 46 has a ring of spaced air vents or openings 47 proximate its peripheral edge.

A fully enclosed motor, of approximately 1/6 H.P. rating, is mounted on the support 11 with its drive shaft 17 extending downward in a vertical plane.

An out-board bearing 21 is mounted at the lower end of the support member 11. A dependent hollow propeller shaft 20 is journaled through the bearing 21 and is connected to the motor shaft 17 through a collar 18 by means of set screws 19.

The propeller shaft 20 has a 1/4" bore 58 therethrough, and has a 1/2" outside diameter.

The length of the shaft 20 is dependent upon the depth of the liquid in the tank, and in the form illustrated, with a 48" liquid depth, the shaft length is approximately 24".

A 11" fan blade 22 is mounted on the shaft 20 approximately 2" below the support member 11, within the sleeve 44, which locates it approximately 3" above the liquid surface 37. The fan 22 acts to blow down any foam 35 which might accumulate in the sleeve interior, and keeps it from creeping up the shaft 20 into the bearings and motor. The fan also acts to ventilate the interior of the sleeve 44, keeping the motor cool as well as assuring a plentiful supply of clean air.

Reference numeral 23 broadly indicates a ram-jet mounted on the shaft 20, approximately 1" above the fan blade 22.

The ram-jet 23 has two tubular arms 24 and 25 mounted in holes leading to the hollow interior 58 of the shaft 20. Each arm has an air-scoop 56 and 57, respectively, faced in the direction of rotation of the shaft 20. Upon rotation of the shaft 20 in a counter clock-wise direction, as illustrated, the revolving elements 56 and 57 scoop up air and deliver it to the shaft bore 58 under slight pressure. A squirrel-cage blower, not illustrated, could be used instead of the ram-jet to deliver air to the shaft bore 58, while in some applications simple bored holes at the same location may provide an adequate air supply.

In cases wherein the apparatus is used in chemical manufacturing processes, such as the halogenation of paraffin, compressed chlorine gas can be introduced directly into the shaft bore 58 by making the motor shaft 17 hollow and connecting the gas line to the upper end of the shaft 17 through a suitable rotating gas-tight joint.

A three blade propeller 27 is mounted on the shaft 20 approximately 7 1/2" below the surface 37 of the liquid 36. At this point, operation of the propeller will create no visible vortex at the surface 37.

A second identical propeller 28 is mounted at the lower end of the shaft 20 approximately 7 1/2" below the upper propeller 27. Both propellers are 3" in diameter in the preferred form illustrated.

The distance between the upper and lower propellers is calculated to be such that the lower propeller 28 will pick up the upper propeller stream before the velocity thereof becomes low enough to allow the hereinafter described bubbles 31 to spread beyond the outside diameter of the lower propeller 28. The lower end of the shaft bore 58 is closed by a plug 26. Reference numerals 29 and 30 indicate two aligned aspirator tubes mounted through the wall of the propeller shaft 20 and open to the bore 58 thereof. Each aspirator tube has an outlet vent 38. The overall diametric length between the outlet vents 38 is preferably less than the outside diameter of the propeller 27, but may be slightly more, so long as the bubbles emitted are caught up in the columnated stream created by the propeller. In the form illustrated the overall diametric length is 2 1/2".

Reference numeral 16 indicates a water-proof electric cable which conducts operating current to the motor 15.

In operation the motor revolves the propeller shaft at a speed of approximately 1750 r.p.m. In the illustrated embodiment of the invention the motor shaft 17 is assumed to be rotating in a counter-clock wise direction.

The rotating propellers create a high velocity unconfined columnated stream in the liquid 36 which extends from near the surface 37 in a perpendicular direction directly downward to the tank floor 43. Due to the fact that the stream has a high velocity when picked up by the lower propeller 28, the additional velocity imparted to the stream by the propeller 28 is adequate to carry the stream to the floor even though the shaft only extends approximately half the liquid depth. Thus a lower end bearing is not needed which does away with costly bearing maintenance and the problem of keeping a long shaft rigid in order to avoid excessive vibration.

The rapid rotation of the ram-jet 23 causes it to scoop up air and deliver it to the shaft bore 58 under pressure, in response to well known physical laws.

At the same time the rotation of the aspirator tubes 29 and 30 produces cavitation in the liquid 36 at their following edges thereby creating a partial vacuum at the vents 38 which causes air to flow out of the shaft bore 58 and through the aspirator vents 38 in the form of relatively large bubbles 31 which are caught up and carried along by the stream from the propeller 27. The high velocity of the stream causes the air bubbles 31 to be held in the stream, close to the shaft 20, and to move therealong toward the lower propeller 28. The stream from the propeller 27 is caught up by the propeller 28 and given an additional impetus in its travel toward the floor 43 of the tank 40. As the entrained air bubbles 31 pass through the propeller 28 they are broken down to small bubbles 32, which approach the ideal bubble size of 0.20 cm. long axis diameter.

The high velocity propeller stream produces strong, rapidly moving currents and counter-currents throughout the mixed liquors, which scour the tank floor, keeping the solid matter in suspension, and also cause most of the bubbles 33 on the tank floor to return toward the liquid surface 37 in a wide flat spiral path 34, which further extends the time of travel.

The scouring action on the tank floor is most effective in that it keeps all the solids in suspension and is greatly superior to that effected by an up or down draught tube.

Intimate rapid mixing of the tank contents is thus effected and the saturation of oxygen in the liquid at the bubble-liquid interface is kept at a minimum, thus immeasurably enhancing the efficiency of the system. Furthermore, due to the absence of shrouds or tubes surrounding the high velocity stream, frictional resistance to movement of the stream is expended in moving the surrounding liquid and not dissipated in frictional loss against such solid immovable elements. Absence of shrouds or confining structures around the propellers makes for foolproof operation, since gross solid materials, paper, rags and other matter that occasionally may be present in the treatment tank will be chewed up by the revolving propellers instead of jamming or clogging the apparatus as occurs when the moving elements operate within a confining structure.

Figure 7:
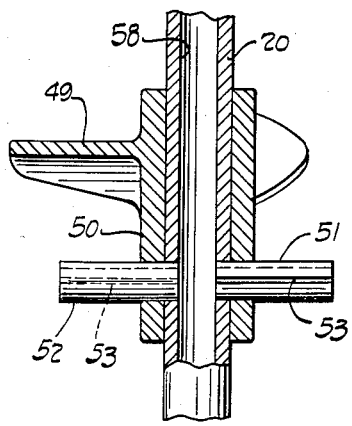
Figure 7 is a vertical sectional view of an alternate form of propeller and aspirator tube combination.
Figure 8:
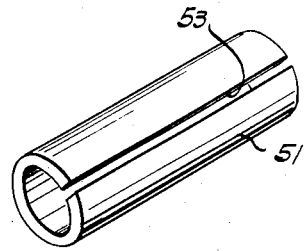
Figure 8 is a perspective view of a roll-pin type aspirator tube, in its unmounted condition.

Figures 7, 8 and 9 illustrate an alternate form of propeller and aspirator construction.

In this form the upper propeller has an elongated downwardly extending hub portion 50. Two diametrically aligned roll pins 51 and 52 pass through the hub 50 and shaft wall 20 into the bore 58 thereof to lock the propeller in position on the shaft. The roll pins act as aspirator tubes as well as locking devices. The longitudinal slots 53 of the roll pins are faced away from the directions of rotation of the shaft 20. The movement of the pins causes cavitation in the liquid at the trailing faces of the roll pins thereby creating an area of reduced pressure which results in the flow of air bubbles in sheet form through the slots, as well as out the open ends of the pins.

In Figure 9 both the upper and lower propellers have roll pin aspirators. Again the lower propeller 54 has an upwardly extending hub portion 55 through which the roll pin aspirators 51 and 52 extend. Again the slots 53 face away from the direction of rotation.

In this embodiment only the upper pair of roll pins will normally aspirate air bubbles since the combined diameters of the bores of the 4 pins is greater than the diameter of the shaft bore 58. However if the upper pair should become in-operative for any reason, the lower pins will go into action automatically. The provision of two sets of aspirators does not alter the operation of the device, but serves to provide insurance against breakdown.

In applications involving very shallow liquid masses a single propeller may be sufficient, in which case the aspirator tubes are positioned above the single propeller so that the large air bubbles will be fined by passing through the propeller.

In other applications such as in the paraffin halogenation process, mentioned hereinabove, where foaming is no problem, an extremely fine bubble size is advantageous. For such uses the aspirator tubes may be placed above the first propeller and passed through both propellers for doubling the bubble size reduction action.

It will now be clear that there is provided a device which accomplishes the objectives heretofore set forth. While the invention has been disclosed in its preferred form, it is to be understood that the specific embodiment thereof as described and illustrated herein is not to be considered in a limited sense as there may be other forms or modifications of the invention which should also be construed to come within the scope of the appended claims.

I claim:
1. In liquid treating apparatus of the type described, the combination of a tank, having top, bottom and side walls, an open ended dependent sleeve mounted through the top wall and extending immediately below the surface of the liquid, a support member mounted in the sleeve above the liquid surface, a dependent motor driven hollow shaft journaled in the support member and extending downward into the liquid, the shaft being closed at its bottom end and having an air inlet positioned above the liquid surface, a fan mounted on the shaft inside the sleeve, above the liquid level and below the air inlet, a first screw propeller mounted on the shaft proximate the liquid surface, two diametrically aligned aspirator tubes mounted on the hollow shaft immediately below the first propeller, the overall length between the air bubble discharge ends of the tubes being approximately the outside diameter of the propeller, and a second screw propeller mounted on the shaft at the end thereof and so spaced from the first propeller that it will pick up the first propeller columnated stream.

2. Mixing and aerating liquid treatment apparatus, comprising in combination, an aerating tank adapted to contain liquid to be treated, a dependent motor driven hollow shaft mounted in the tank above the liquid and extending downward into the liquid in the direction of the tank bottom, the shaft being closed at its bottom end and having an air inlet positioned above the liquid surface, a first screw propeller mounted on the shaft proximate the liquid surface at a point whereat no visible vortex will be formed at the operational speed, a second screw propeller mounted on the shaft downwardly of the first propeller at a point whereat it will pick up the columnated stream from the first propeller, and two diametrically aligned aspirator tubes mounted on the shaft immediately below the first propeller, the overall length between the air discharge ends of the aspirator tubes being approximately that of the diameter of the propeller.

References Cited in the file of this patent

UNITED STATES PATENTS

| | | |
|---|---|---|
| 79,048 | Appleby | July 23, 1868 |
| 653,746 | Jewell | July 17, 1900 |
| 1,417,883 | Beers | May 30, 1922 |
| 1,445,935 | Daman et al. | Feb. 10, 1923 |
| 1,925,777 | Sperling | Sept. 5, 1933 |
| 2,187,746 | Lefevre | Jan. 23, 1940 |
| 2,194,037 | Thuma | Mar. 19, 1940 |
| 2,293,183 | Walker | Aug. 18, 1942 |
| 2,592,904 | Jackson | Apr. 15, 1952 |
| 2,767,965 | Daman | Oct. 23, 1956 |

FOREIGN PATENTS

| | | |
|---|---|---|
| 19,836 | Great Britain | 1912 |
| 48,730 | Denmark | Apr. 28, 1934 |
| 506,758 | Belgium | Nov. 14, 1951 |
| 762,263 | France | Jan. 18, 1934 |